(12) United States Patent
Devecka

(10) Patent No.: US 6,268,557 B1
(45) Date of Patent: *Jul. 31, 2001

(54) METHODS AND APPARATUS FOR PROVIDING AN INTERACTIVE MUSICAL GAME

(76) Inventor: John R. Devecka, 286 Pershing Rd., Clifton, NJ (US) 07013

( * ) Notice: Subject to any disclaimer, the term of this patent is extended or adjusted under 35 U.S.C. 154(b) by 0 days.

This patent is subject to a terminal disclaimer.

(21) Appl. No.: 09/481,919

(22) Filed: Jan. 13, 2000

Related U.S. Application Data

(63) Continuation of application No. 09/058,722, filed on Apr. 10, 1998, now Pat. No. 6,018,121, and a continuation of application No. 08/720,295, filed on Sep. 26, 1996, now Pat. No. 5,739,457.

(51) Int. Cl.[7] .................. G10H 1/32; G10A 3/00
(52) U.S. Cl. .................. 84/743; 84/600; 84/477 R; 434/307 A
(58) Field of Search .................. 84/477 R, 600, 84/743; 434/307 A; 463/35, 48; 273/440

(56) References Cited

U.S. PATENT DOCUMENTS

| | | | |
|---|---|---|---|
| 4,695,903 | 9/1987 | Scrap et al. | 358/335 |
| 5,214,231 | 5/1993 | Ernst et al. | 84/652 |
| 5,484,291 | 1/1996 | Nakai et al. | 434/307 |
| 5,491,297 | 2/1996 | Johnson et al. | 84/609 |

OTHER PUBLICATIONS

Partial Japanese Translation of 5,214,231.
Partial Japanese Translation of 5,484,291.
Partial Japanese Translation of 4,695,903.
Official Action of USSN 08/720,295 dated Jul. 10, 1997.
Amendment of USSN 08/720,295 dated Oct/ 14. 1997.
PCT International Publication WO 98/13820 dated Apr. 2, 1998.
"Mac Fan" Magazine published May 1, 1996.
Japanese Patent Application 6–250644 published Sep. 9, 1994.
"Ikinari Musician" game software handbook published Mar. 5, 1987.
"Chozetsu Daigirin" game catalogue published Apr. 15, 1998.

*Primary Examiner*—Jeffrey Donels
(74) *Attorney, Agent, or Firm*—Priest & Goldstein, PLLC

(57) ABSTRACT

An interactive electronic drum system and training techniques suitable for use in a coin-operated environment such as an arcade are described. Electronic drum pads, audio speakers, a visual display, training lights and an overall control system are combined to simulate the excitement of a live drum or interactive musical jam session for a user. Positive feedback and, as necessary, instructive aid are provided to make the experience a positive one for both the novice and the expert player. Learning and playing a musical instrument becomes an intuitive, exciting experience and not a boring chore to be endured. Players can simulate the experience of playing in a rock band before a live and appreciative audience. In short, this interactive electronic drum system makes drums and the jamming experience widely accessible to the public.

25 Claims, 9 Drawing Sheets

METHODS AND APPARATUS FOR PROVIDING AN INTERACTIVE MUSICAL GAME

This application is a cont. of 09/058,722, filed Apr. 10, 1998, now U.S. Pat. No. 6,018,121, and is a cont. of 08/720,295, filed Sept. 26, 1996, now U.S. Pat. No. 5,739,457.

The present invention relates generally to methods and apparatus for providing an exciting interactive audio visual musical experience which may readily be enjoyed by a wide range of users having a range of experience from little or none to those having extensive musical training. More particularly, the present invention relates to an interactive electronic drum and music training method which are suitable for use in a home video game or a coin-operated environment such as an arcade to simulate the excitement of a live jam session for a user.

THE BACKGROUND OF THE INVENTION

A wide variety of learning and teaching aids for musical instruments have been known for some time. See, for example, U.S. Pat. No. 4,919,030 "Visual Indication of Temporal Accuracy of Compared Percussive Transmit Signals," U.S. Pat. No. 5,036,742 "Tempo Monitoring Device and Associated Method," U.S. Pat. No. 5,945,786 "Method and Apparatus for Controlling Scale Practice of Electronic Musical Instrument," and U.S. Pat. No. 5,214,231 "Apparatus for Electronic Teaching Accompaniment and Practice of Music, Which is Independent of a Played Musical Instrument." These and like approaches may suffer from a variety of drawbacks. By way of example, they may only be used by experienced musicians or those with a significant knowledge of music theory. Alternatively, they may not be readily intuitive in their operation, or they are not designed to be fun and provide a positive experience which helps keep the user eager to learn.

For years, electronic drum pads have been available through music stores. Many patents describe a variety of aspects of such drum pads. See, for example, U.S. Pat. Nos. 4,781,097, 4,947,725, 4,932,303, 5,009,146, 5,177,313 and 5,233,658, all of which are incorporated by reference herein in their entirety. A first time user would have to purchase these relatively expensive pads and determine at a later date if he or she enjoyed playing drum pads, what is involved, and what the final outcome of their efforts would produce. After buying the pads, the user was typically left without guidance as to how to play them. Thus, the novice user did not have any formatted learning structure or any positive feedback to encourage continued learning. Further, typical musical instruction exercises are typically renowned for being dull and repetitious.

Further, a variety of coin-operated audio visual musical devices are presently known. See, for example, U.S. Pat. No. 3,990,710 "Coin-Operated Recording Machine," U.S. Pat. No. 4,695,903 "Audio Video Entertainment Module," and U.S. Pat. No. 4,965,673 "Apparatus for a Video Recording Booth." Additionally, a wide variety of action and adventure type video arcade games, such as auto race and various war or battle games in which the player fights against the machine or another player are known. None of these approaches provides a musical learning experience that is like a game or adventure encouraging a positive learning experience of a musical skill.

Standard video arcade games are very popular but often are violent in nature and involve a complex combination of button activations and joystick movements that may be daunting to the novice. As a result, a need exists for a non-violent game which provides a positive experience for the novice and the expert alike, and which is exciting enough to replace the standard beat-em-up, shoot-em-up fare that many adults find unacceptable.

SUMMARY OF THE PRESENT INVENTION

The present invention addresses needs, such as those outlined above, by providing a unique combination of features and suitably packaging them so they may be appropriately enjoyed in an arcade setting. Home use can also be envisioned.

In one embodiment of the present invention, a money operated electronic drum system is provided in conjunction with audio-visual inputs to both help a user learn to jam on or play the drums and to enjoy the jamming experience. In this context, "jamming" may suitably be defined as free playing over music. That is to say not reading music, but rather intuitively and naturally playing and reacting to create music as the music proceeds. For example, a drum player may create suitable drum beats to match accompanying instruments such as a guitar or keyboard.

In one aspect, the present invention provides an interactive series of menus to guide a user to select a desired mode of operation. A series of cuing LEDs or other light indicia on or associated with the drum pads, or alternatively a video representation on a display may guide the user in the correct sequence and striking of the drum pads, and a control system controlling audio and video devices will provide appropriate feedback to both encourage the user and to make the experience enjoyable.

In one mode of the present invention, the user chooses to play along with his or her favorite type of music with the system including a source of music, such as a compact disk ("CD") player which may be of a jukebox format, a tape player, a radio or the like. In another mode of operation, the user tries to play along with a drum progression which increases in difficulty. The control system monitors and scores the user's play, and also provides feedback to encourage the user.

Other features and advantages of the present invention are described further below and will be readily apparent by reference to the following detailed description and accompanying drawings.

DETAILED DESCRIPTION

Figure 1:
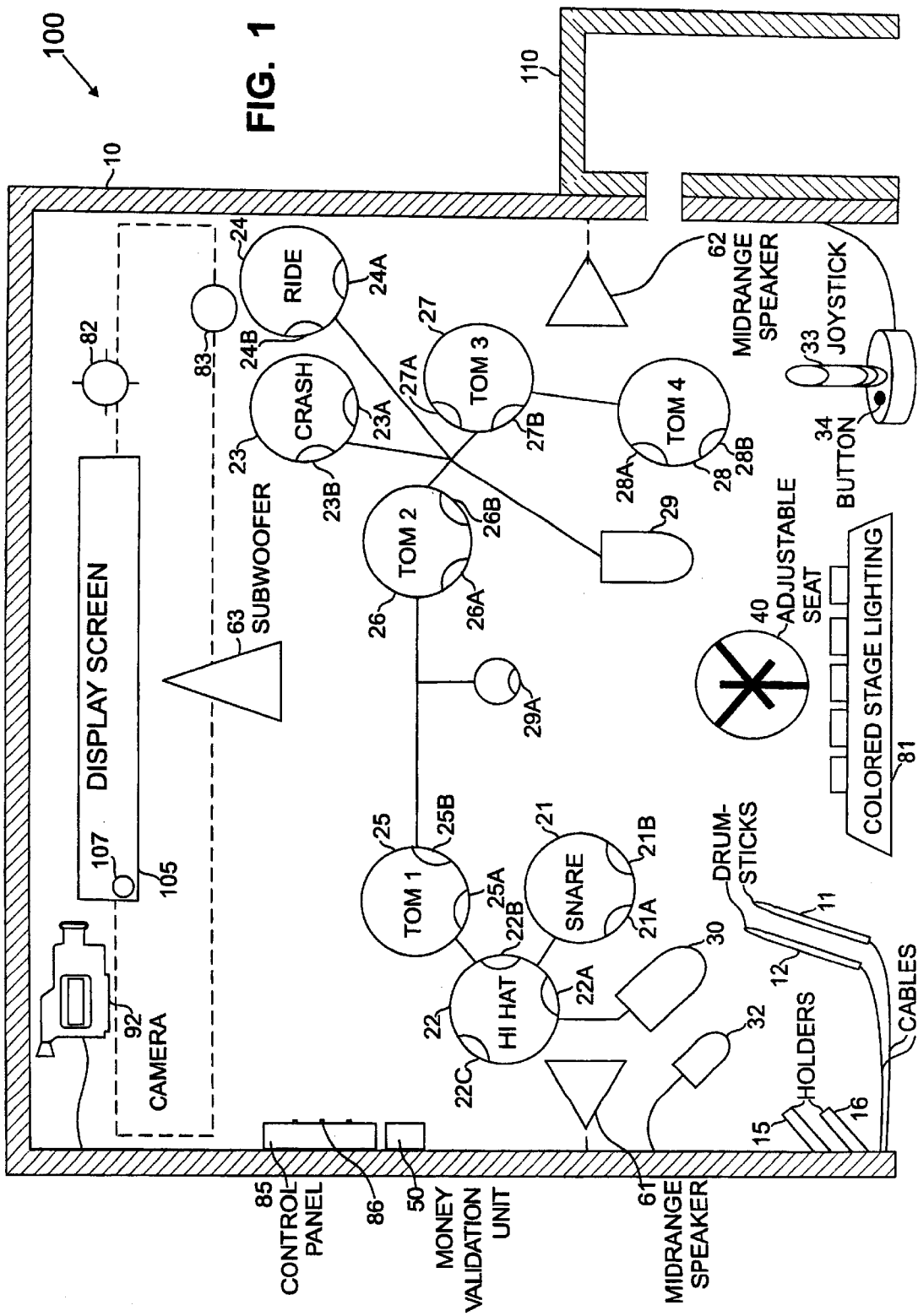
FIG. 1 illustrates one embodiment of drum apparatus in accordance with the present invention suitable for use in a money-operated arcade embodiment.

FIG. 1 shows an overall view of an audio-visual interactive drum studio system 100 in accordance with the present invention. System 100 preferably includes a cabinet 10 for housing, enclosing and mounting the various components of the system. The cabinet 10 will preferably consist of a sound and fire resistant frame which may be painted to emphasize the effectiveness of the system's lighting as further described below. The system 100 also includes a drum set layout 20 which may preferably include electronic drum pads for snare 21, hi-hat cymbal 22, crash cymbal 23, ride cymbal 24, and toms one through four 25–28, as well as a bass drum foot activator or pedal 29, a foot pedal or activator 30 for controlling the opening and closing of the hi-hat 22, and an additional foot pedal or activator 32 which may be included to add a variety of additional sound effects, such as a "wa-wa" or the like. While it is presently preferred to utilize a standard electronic drum pad employing sensors, such as piezoelectric sensors, to produce an output indicative of the occurrence of a pad strike, as well as the force of the strike, it will be recognized that a simpler and less expensive arrangement may employ a user input sensor which merely senses a touch, strike, or any switch closure causing event initiated by the user. It will also be recognized that while a device looking like a drum pad is presently preferred, other form factors such as a device looking like a guitar 20' (FIG. 2), a keyboard 20" (FIG. 2) or a simple switch arrangement may also be employed. By way of example, a joystick or other activator 33 and a button or buttons 34 may be employed to allow a second user or a younger, less coordinated user to enjoy the system. For example, a left to right or back and forth movement of the joystick 33 may allow a second user to make other sounds such as hi-hat, maraca, tambourine, or other sounds. The button or buttons 34 may allow the second user or a less advanced user to activate a sequence of drum rhythms or the like.

Each of the drum pads or pedals preferably has one or more associated LEDs or other indicia 21A and 21B, 22A–C, 23A and 23B, 24A and 24B, 25A and 25B, 26A and 26B, 27A and 27B, 28A and 28B, and 29A, respectively, to guide the beginning user in learning how to use the system by cuing the user to strike the appropriate pads or pedals of the drum set layout at the appropriate time as more fully described below.

The system 100 further includes an adjustable stool or seat 40 for the user to sit comfortably in front of the drum set layout 20, a money validation unit 50, such as a coin changer, bill validator or the like, and a series of audio speakers 60, which may suitably include left and right midrange speakers 61 and 62, and a subwoofer 63. Additional speakers may be added as desired to improve the audio quality of the system.

The system 100 as further illustrated in FIG. 2 also preferably includes a central processing unit or control system 70, suitable lighting 80 which may include colored stage lights 81, overhead white and black lighting 82 and 83 respectively which will preferably be variably controlled by the control system 70 as described further below. A strobe light 84 which will preferably be mounted in the ceiling of the cabinet 10 may also be provided.

The user may enter data and select modes of play using a control panel 85 with selection buttons 86. A multi-disk CD player 90, preferably of the jukebox type, or other music source will also preferably be employed to allow a user to select musical accompaniment allowing the user to play along with a favorite musical selection as more fully described below. A camera 92 and a VCR 94 may also be provided. The camera 92 may be used to record a part or parts of the user's session to be displayed on a screen or display 105. By way of example, the user who achieves a high score may be allowed to choose to have his or her play sequence run on the screen 105 when the system 100 is not in use. As another alternative, the user's performance could be cut and pasted into a video of a live band playing the music that the user is playing. Many exciting possibilities exist.

The display screen 105 may suitably be a CRT display, and this display will preferably be utilized to provide user cues and instructional information. As discussed further below, screen 105 may also be employed to show the user video images, such as video of a rock concert audience positively reacting to the music being played. Such video may be provided from memory in the control system 70 or alternatively from a videotape in the VCR 94. Such a videotape may include, by way of example, instructional video of how to play the system with a variety of lessons which can be selected by the user or video of a professional drummer utilizing the system 100.

Finally, the control system 70 and other components such as the multi-disk CD player, the VCR 94 and the like will preferably be housed in a satellite cabinet 110 as shown in FIG. 1. This cabinet will be accessible by lock and key to the operator or service personnel.

While the above described components are shown in the drawings and discussed in the context of a presently preferred embodiment of the invention, it will be recognized that similar and other components may be added to enhance the system or that certain of these components may be subtracted to reduce the cost of the system. As one example, while a money-operated arcade system is presently preferred, it will be recognized that the present invention may be readily adapted to the home environment in a system in which electronic drum pads would be suitably interfaced with a home computer or a video game controller and a television without the need for a money validation unit, such as a coin or bill validator, or special cabinets. Additionally, a CD or radio might be connected in such a home system to provide player accompaniment. Further, while the present specific disclosure is made in the context of electronic drum pads and pedals which are presently preferred, it will be recognized that the present invention may be adapted to other formats in which button presses or switch closures are used by a user to perform or play. For example, a guitar-like device having a number of buttons could be utilized as the user's input device. Alternatively, a simple keypad or keyboard could be employed. Preferably, the aspects of the inventive arrangement described further below would be employed therewith to continue to make the unit accessible to the novice user.

Figure 2:
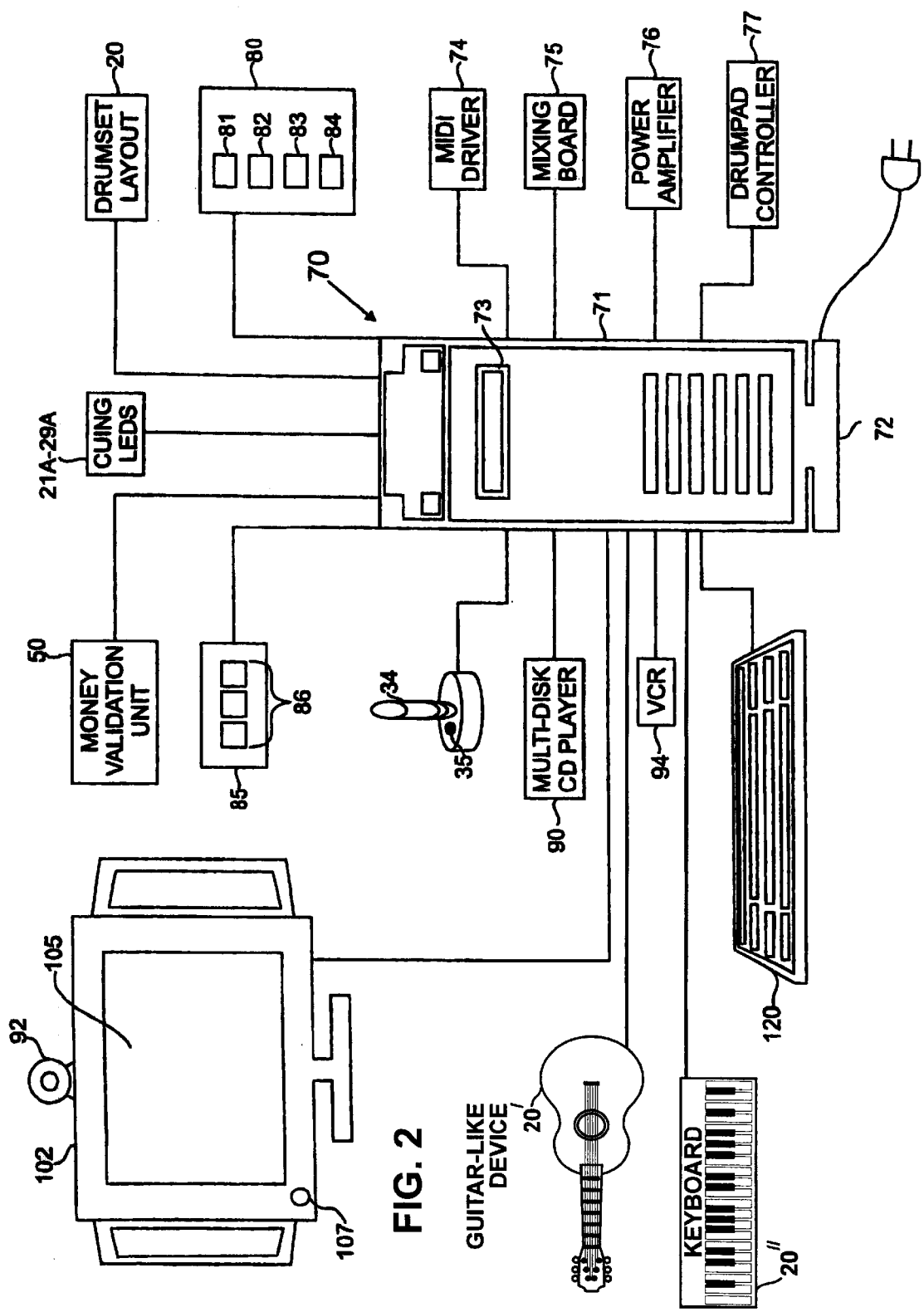
FIG. 2 illustrates in block diagram form further details of control and processing circuitry suitable for use in conjunction with the apparatus of FIG. 1.

FIG. 2 illustrates further details of one suitable control system 70 for use in conjunction with the various devices to be monitored and controlled in system 100 of FIG. 1. While the control system 70 is presently preferred because it can be readily implemented with off the shelf components, it will be recognized that custom designed and different components may be readily used to achieve the desired functionality of the present invention.

As shown in FIG. 2, the control system 70 may comprise a suitably programmed PC computer having a central processing unit 71 in a cabinet 72 which also may include a built in CD ROM drive 73, which may be employed as an alternative to or in addition to the player 90. The control system 70 will also include a standard or custom MIDI ("Musical Instrument Digital Interface") driver 74 which may be an internal card or an external component. Driver 74 allows the system 70 to be readily programmed to drive sound speakers, such as the speakers 61–63 to provide appropriate sounds.

The control system 70 will also typically be connected to various additional components such as the pads and pedals of drum set layout 20, cuing LEDs 21A–29A, joystick 34, sound button or buttons 35, a mixing board 75, a power amplifier 76, drum pad controller 77, lighting system 80, control panel 85 and control buttons 86, multi-disk CD player 90, camera 92, VCR 94, a monitor 102 whose CRT screen may be suitably employed as the display 105 and a keyboard 120. The monitor 102 may be part of an integrated unit also including a microphone 107 for audio pickup and speakers 111 and 112. These speakers may be utilized as the previously mentioned speakers 61 and 62, or as speakers supplementing the audio outputs of the speakers 61–63, or to provide software driven instructions to the user. It will be recognized, however, that larger and higher quality microphones or audio speakers may be desired to provide a superior experience for the user. This will be particularly true in the arcade environment. For example, a better microphone may be desired to provide a karaoke mode or to record the user's singing along with the user's playing.

The keyboard 120 will preferably be a standard keyboard, and may be employed to allow a user to make selections or preferably to allow a service person to diagnose any malfunctions of and to perform routine maintenance on the system 100. For example, keyboard 120 may be mounted on the cabinet 10 within easy reach of a user sitting on the stool 40. It may have a protective cover that covers most of the keypad allowing user access to only a limited number of keys to make program selections as described below. A service person could be given a key to open the cover and gain access to the keyboard 120 to service the system 100.

While shown in FIG. 2 without any protective casing other than the standard cabinet 72 for ease of illustration, the control system 70 will preferably be housed in a protective casing such as the satellite cabinet 110 of FIG. 1 to prevent any damage to the unit in the somewhat rough and tumble environment of the typical arcade. This casing will limit system access to the owner or operator and authorized service personnel. Similarly, drumsticks 11 and 12 will be preferably connected to the cabinet 10 by strong, light and flexible cables 13 and 14, such as steel stranded cable. When not in use, drumsticks 11 and 12 will preferably be placed in holders 15 and 16 mounted so that the drumsticks 11 and 12 will be readily seen and reached by users. In a home environment, such a protective casing and drumstick cable mounts should not be necessary.

Turning to the operation of the system 100, the system utilizes the cuing LEDs or other indicia 21A–29A which are associated with their drum pads and pedals to provide visual guidance on which drum pad or pedal to play, which hand or foot to play it with, and when to play it. The speakers 60 may also be driven to provide audio cues to correct play. As described further below, this cuing or instruction is subject to suitable program control by the control system 70 which drives both the cuing LEDs and the speakers. Data on the users performance which is collected by the control system 70 may be fedback and displayed on the screen 105 to the user. Similarly, the correct order or rhythms of striking the drums and graduated steps of rhythmical sequences may also be displayed on the screen 105. The user will thus be guided by visual and audio stimuli to use his or her hands and feet for certain repetitive drum sequences generated by the CPU of system 70. Preferably, left and right lights, such as light 21A (Left) and light 21B (Right) for snare 21 indicate when the left and right hands should be playing. Similarly, the light 22C indicates when the user's foot should activate foot pedal 30 to raise hi-hat 22. As addressed further below, different sequences can be selected by the user via computer menu selection. Thus, as further described below, the inventive system provides an enjoyable opportunity to learn how to play an electronic drum set.

A first level of play is to master certain basic skills. The user will then be able to move on to several more advanced playing scenarios. By way of example, one level or mode of play of the present invention is to play the electronic drums with visual indications of the rhythmical sequence provided to guide the user. In this option, the visual LEDs or indicia are illuminated to cue the appropriate rhythm and teach the desired audio sounds of the various pads. A second level of play is playing the electronic drum pads with the visual indicators along with an actual sequence of music, such as a prewritten song of the user's favorite type of music. A further level of play is to play against the visual indicators where the performance, may be rated. For example, the accuracy of the user's rhythm of play may be measured, and feedback in the form of scores or otherwise may be given. Another level of play is playing along with music generated from compact disks or the like where the user can try to play along with his or her preferred music. Another option is free play, giving the user the opportunity to hit the electronic drum pads 20 freely to get accustomed to the sounds and feel of the system. This mode also allows the player the chance to test the abilities that were learned via the illuminated displays without any guidance. Free play without any feedback is the normal and only mode of play with standard acoustic drums. As discussed in greater detail below, a variety of feedbacks are possible to enhance the learning or game experience to make it truly enjoyable.

Figure 3:
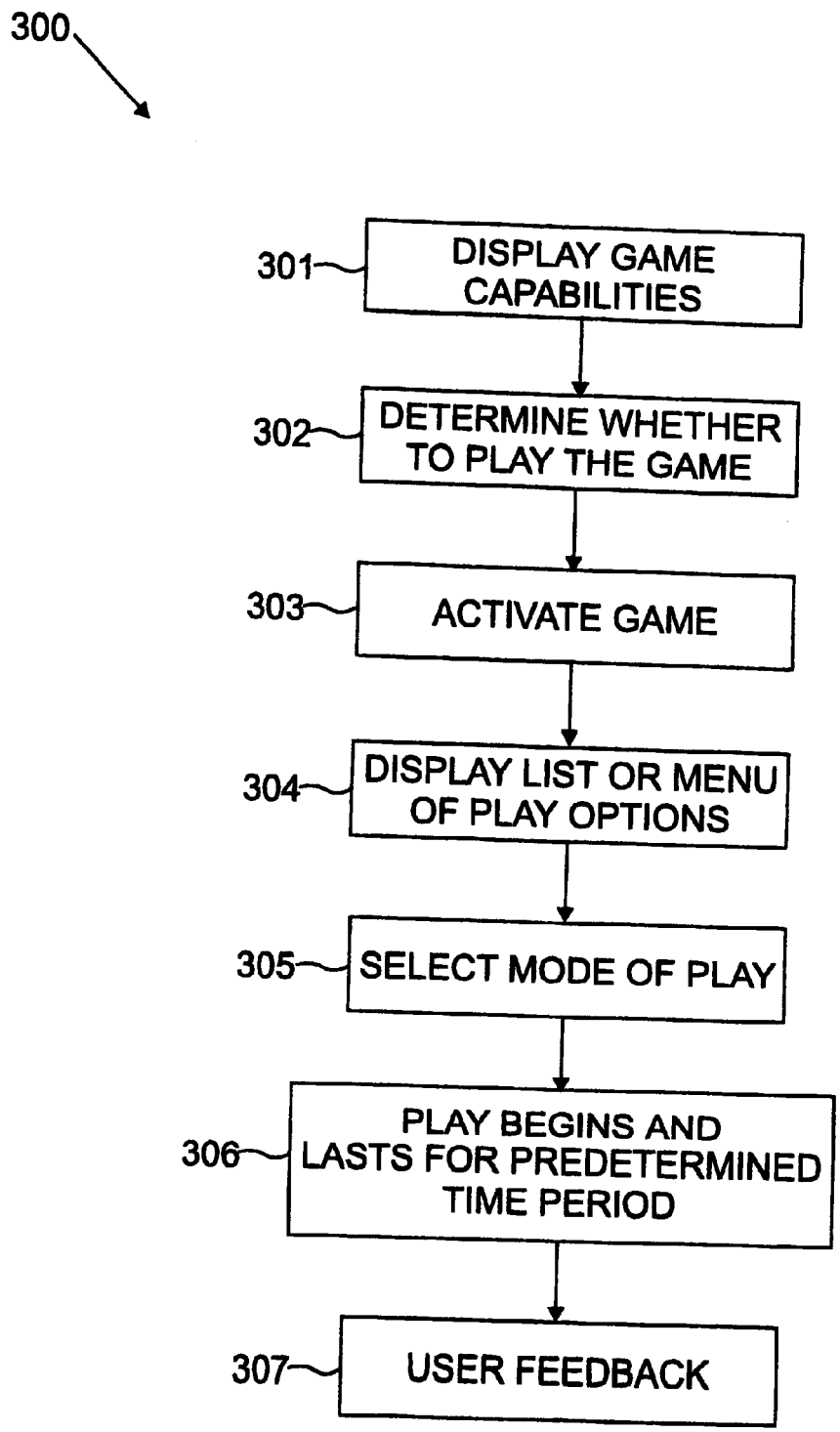
FIG. 3 illustrates one overall flowchart of the operation of the drum apparatus of FIG. 1.
Figure 4:
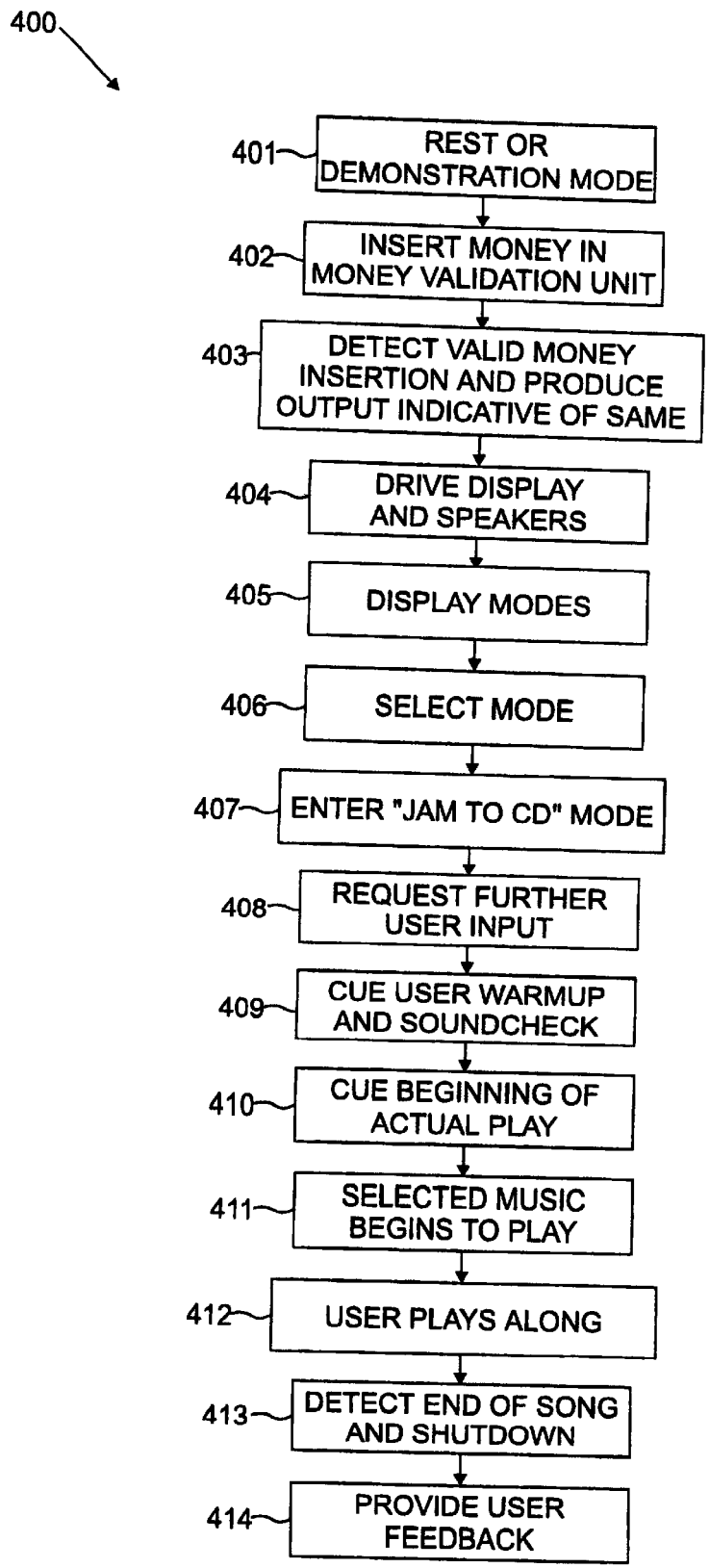
FIGS. 4–4C are more detailed flowcharts illustrating details of various possible play modes in accordance with the present invention.

FIG. 3 shows a first overall flowchart of one method or process 300 in accordance with the present invention. FIGS. 4–4C illustrate in greater detail various presently preferred modes of play. In step 301 of FIG. 3, a user may watch a display which displays the capabilities of the game, such as the display 105 of FIG. 1, to determine if the game is one which he or she chooses to play out of the many in an arcade. To this end, a control system such as the control system 70 should preferably be programmed to cause display 105 to engagingly display the capabilities of the system. Additionally, the control system 70 may also drive the speakers 60 to audibly explain the system capabilities, play music, drum jams, or otherwise attract potential users' attention.

In step 302, a potential user decides whether to play the game. In step 303, the user decides to try the game and activates the system. For example, the user inserts the necessary amount of money. To this end, the user may insert a dollar in coins or currency ($1) into a coin mechanism or bill validator 50 as shown in FIG. 1.

Next, in step 304, the display 105 displays a list or menu of play mode options. At the same time, audio instructions may be provided by the speakers 60. In step 305, a user selects a mode of play. The user preferably selects from a menu of options displayed on the display 105. As addressed further below, a wide variety of other play type selections may also be made. For example, the user may enter a level of skill, select a choice of lights and sequenced music, the level of difficulty, the tempo and the like.

In step 306, play begins and lasts for a predetermined time period, such as three minutes. Alternatively, play time may vary. For example, if the user chooses to play along with a favorite song, the play time may last for the duration of the selected song. During this period, the user plays the drums in accordance with the mode selected as described in greater detail below. As the drumming session ends, feedback is provided to the user in step 307. For example, a crowd may cheer, a score may be displayed, or the like.

FIGS. 4–4C illustrate further details of presently preferred modes of operation in accordance with the present invention. In step 401 of FIG. 4, the system, such as system 100, is in a rest or demonstration mode waiting for a user to choose to use the system. In one presently preferred rest mode, a demonstration song is played. In this demonstration song, the drums are playing. As the drums play, the learning or cuing lights, such as the LEDs 21A–29A associated with the drum pads 21–29 corresponding to the drum sounds heard by the user, are flashing in accordance with what is being played. The demonstration song may switch themes from a drum based demonstration to an instrument based demonstration, such as for example, keyboard sounds, orchestra sounds, or various other instruments. The demonstration mode illustrates the flexibility of the playing modes of the machine. Also, it may help to show how the instruments are played on the pads, and is intended to attract the interest of people wanting to play with the system 100. A videotape of a professional drummer playing the system 100 or giving a quick lesson on how to use the system may also be played. To this end, a suitable videotape may be played on the VCR 94 and displayed on the display screen 105.

In step 402, a person has decided that he or she wants to play. As a result, the person sits down, picks up the drum sticks and inserts money into a money validation unit, such as the coin or bill validator 50 of FIG. 1. A credit card, debit card, smart card or token reader might also be employed to provide the user with additional flexibility in making the required payment.

In the FIG. 4 embodiment, each insertion of money preferably triggers a sound type, for example, a bass drum sound. Alternatively or additionally, a crowd scene may be displayed on a video display, such as the display 105, and the sound of the crowd starting to clap and cheer just as it occurs before the beginning of an actual concert may be produced by audio speakers, such as speakers 60.

To this end, the money validation unit 50 detects each insertion of money and produces an output indicative of the recognition of valid money in step 403. In step 404, the control system 70 receives the output from the money validation unit 50 and drives the display 105 and speakers 60 as described above.

Figure 5:
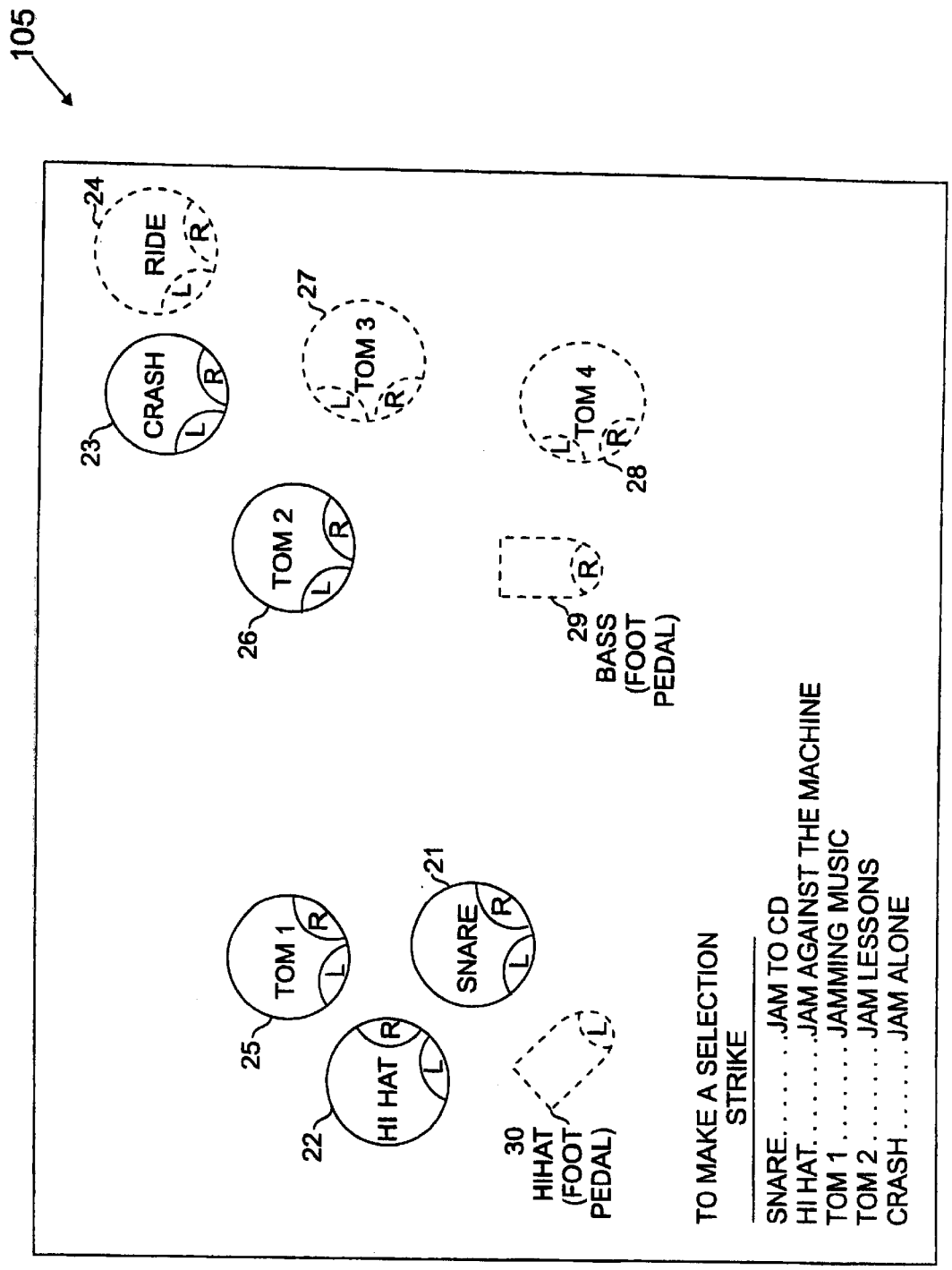
FIG. 5 illustrates a menu selection technique in accordance with the present invention which assists a user in learning the various drum pads and how to strike those pads.

In step 405, a variety of playing modes may be displayed on a display such as the display 105. For example, the following five modes may be displayed: "Jam to CD", "Jam Against the Machine", "Jamming Music", "Jam Lessons" and "Jam Alone" for selection by the user. The user may make a selection in a variety of ways. For example, the display 105 may be a touch screen and the user may make a selection by touching the appropriate part of the screen. Alternatively, the display 105 may display five of the drum pads 20 as shown in FIG. 5 as well as the instruction to strike the appropriate pad to make a selection. Upon a pad being struck, the control system 70 will then drive the speakers to audibly give the same instruction. As shown in FIG. 5, pads 21, 22, 23, 25 and 26 are shown in solid lines and pads 24, 27 and 28 and foot pedals 29 and 30 are shown in dotted lines as only five pads are needed to select from the five menu items. A similar approach may be employed to respond "yes" or "no" or to enter other data. The user makes the selection by striking the appropriate pad. This approach has the advantage of immediately starting the learning process of the pad names, their function and their feel. Alternatively, the series of selection buttons 86 provided on the control panel 85 may be employed to make this selection.

If in step 406 the user selects the Jam to CD mode, the system 70 enters that mode in step 407. Both the display and speakers may be utilized to request further user input in step 408. For example, the speakers 61–63 may be used to say: "Enter your choice of CD" or "Enter CD Jam Number" which corresponds to the CD and music which the user wishes to play along with. By way of example, the CD selection information may be provided by a simple selection list or displayed on the display 105. After that choice is made, the user may next be asked "Would you like a quick lesson?" with the user being given the option to select "Yes" or "No". The same information will preferably be displayed on the display 105. Next, the user may be cued through a warm-up in step 409. For example, the user is told to "Hold your sticks like this" and a picture illustrating the proper way to hold the drumsticks is displayed on the screen 105. Next, the unit may say "Let's do a sound check." At this point, the lights 21A–29A indicate and a voice says through speakers 61–63: "Hit the snare, hi-hat, hi-hat pedal, bass pedal, tom 1, tom 2, tom 3, tom 4, ride cymbal, and crash cymbal." On the display, as shown in FIG. 5, both the name of the pad or pedal and the shape and location of the drum pad or pedal with relation to the other pads may be displayed in the correct sequence to illustrate the desired warm up sequence. If during the sound check 409 the user is hitting the drum too lightly, a signal measuring device in drum pad controller 77 will produce an output signal which is then provided as an input to the system control 70 which will drive the speakers to say "Strike the drum harder." Next, a standard 4/4 beat may be played by the system 100 with lights 21A–29A flashing on and off in the correct sequence to illustrate the correct timing and the correct striking hand or foot to the user. A voice may also say "Most beats are played using the snare, hi-hat and kick pedal. Basic fill is played. Fills are usually played on the toms and end with a cymbal crash. Relax, listen to the music and try to play along or bang around and just have fun. You can't make a mistake. If you want more lessons choose the 'jam lessons' mode from the menu next jam. It's time now to begin." As such a warmup may take a moderate amount of time, an operator may choose to leave out the quick lesson to increase the turnover of the system. Leaving out the warm up may be particularly appealing to an operator where potential users are often lined up waiting to play the game.

At this point, the beginning of actual play is cued in step 410. For example, a screaming, foot-stomping, hand-clapping crowd may be heard on the speakers 61–63. Normal room white lights 82 may be lowered. Colored stage lights 81 may be turned on to appropriate levels and begin syncopating to simulate a live concert atmosphere. Also, black lights 83 may be pulsed on and off. Also, strobe 84 may begin flashing with all the above lights preferably controlled by the controller 70. The display 105 may show an enthusiastic crowd. It will be recognized that the lights 81, 82, 83 and 84 may be controlled in a variety of manners. One presently preferred control option is to control them in response to the user's activity. For example, if a user plays faster, the strobe may flash more quickly.

In step 411 the selected CD song is cued by the control system 70. In step 412, the user plays along to the song. As the song plays, the user can change to any one of several different pad sounds during the song that are preprogrammed when the CD is programmed. For this mode, the operator will code the music, Rock 01, Rap 02, Jazz 03 and the like, and the control system 70 will generate the drum sets that match the music style.

The user can also preferably change the volume levels of the drums or music to be louder or softer. For example, song volume may be varied via a volume knob on the control panel 85. Alternatively, the unit 100 may ask the user "Do you want to play louder?" and if the user shouts above a certain threshold as detected by microphone 107, the system control 70 will crank up the volume. Alternatively, the operator may preset a fixed level or the user may select the level as part of a setup menu.

When the song is over, the control system 70 detects that the song is over by sensing the lack of DC signals coming from the output of the CD unit 90 in step 413 and shuts the game down. In step 414, positive user feedback is provided. For example, a long crowd roar may be triggered and a voice may announce "great jam" loudly!

Figure 4A:
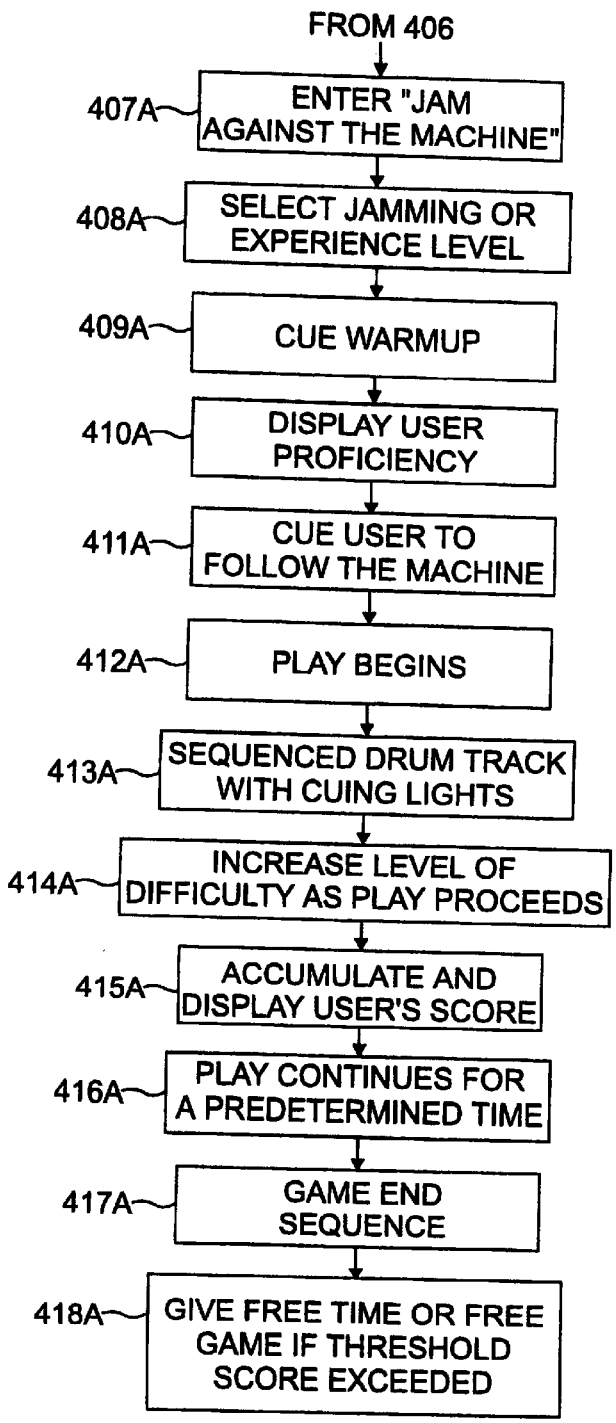

If the user selects the "jam against the machine" mode in step 406 as illustrated in FIG. 4 then that mode is entered in step 407A as further illustrated in FIG. 4A. A second menu is preferably displayed in step 408A to allow the user to select a jamming level matched to his or her level of skill, for example, beginner 1, advanced beginner 2, intermediate 3 or expert 4. Next, a warmup is cued in step 409A. For example, a voice may say "let's warm up, give me a drum roll, come on speed it up". Simultaneously, on screen 105, the user's speed of striking the pads, for example, a speed level of 0–100 beats per a predetermined time interval, such as fifteen seconds, shows the user the speed of the drum roll. Next, the voice may say, "not bad, not bad at all." It will be recognized that different warmup exercises may be employed, as well as, different measures of the user's proficiency. For example, the user's proficiency in correctly following the correct rhythm or tempo may be measured.

In step 411A, the user is cued to follow the machine. For example, the machine may start to play a steady bass drum beat indicative of the proper tempo. Next, the user may be told "Now play what I play." For example, two hand drum riffs or rhythms. In this context, a "riff" may be defined as a set of notes or rhythms in a pattern. In step 412A, play begins with an announcement, "We're ready to go", for example. In step 413A, a sequenced drum track starts with cuing lights indicating what the user should play over the music. Alternatively or additionally, a videotape of an instruction lesson of similar content may be displayed. The user then may initiate the actions of a videotape instructor. A display such as that discussed in the context of FIG. 5 may also be used to highlight the correct pad or pedal and striking hand or foot. As time passes, the level of difficulty increases in step 414A. At the lower difficulty level, the unit desirably has more flexibility in scoring. In the present example, the user's score is preferably based on repetition, accuracy and speed. Scoring may be based on a point system with a value for each correct strike and increasing points for each advancement in difficulty. The display 105 may show a constantly updated jam score as the jam proceeds. In step 416A, a timer allows play to proceed for a predetermined time, such as 3 minutes, and a final score is given at the end of play. In step 417A, the game end sequence begins. The song ends. The game is over, the crowd cheers, and the unit says "great jam."

Figure 4B:
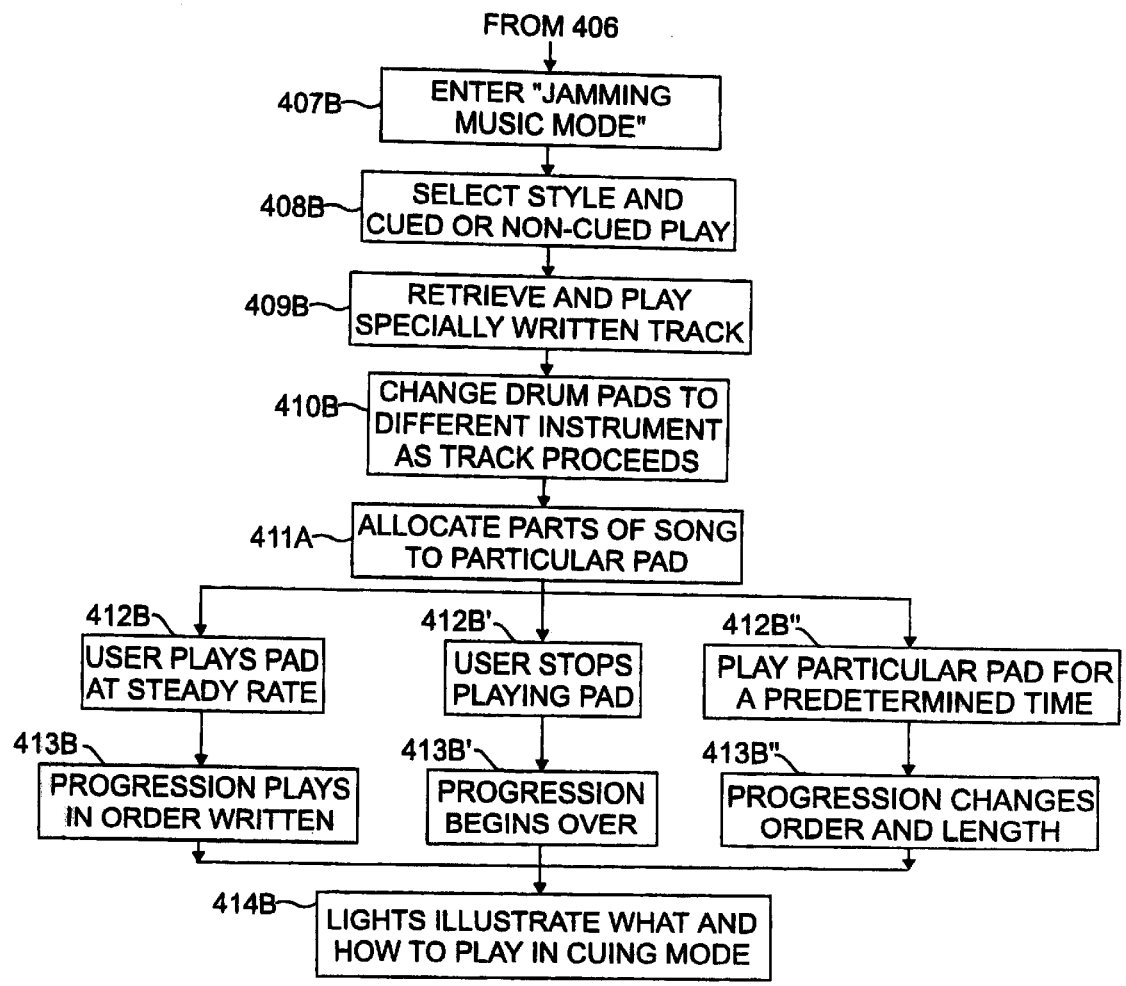
Figure 4C:
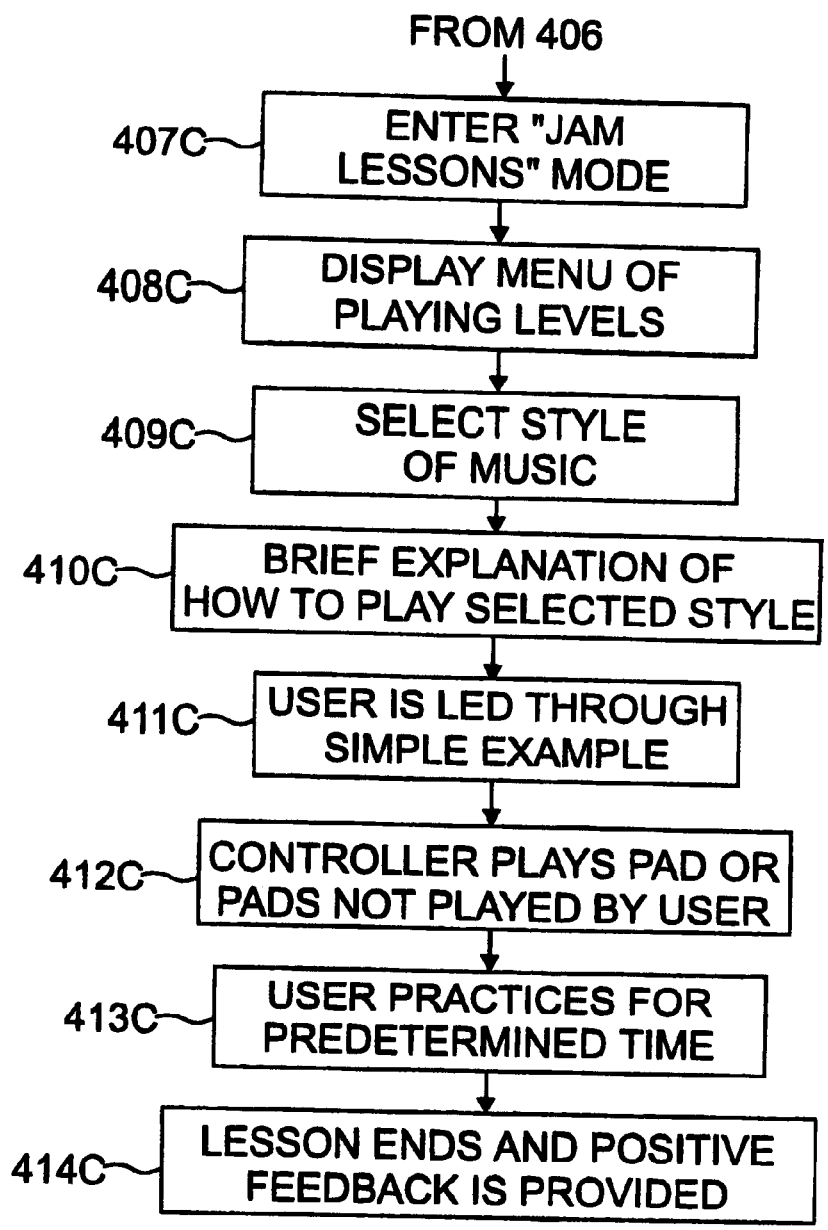

If the "jamming music" mode is selected as illustrated in FIG. 4B, a specially written track of background music, written for drum and instrument soloing is preprogrammed in the control system 70. After entering the jamming music mode, the user is provided the options of selecting a preferred style of music and selecting a light indicia, display or videotape cued mode of play or a free play mode in step 409B. Then the specially written track is retrieved and begun in step 409B. When the cuing lights have been chosen and activated, the lights will illustrate to the player what, when and how to play the pads. If jamming with lights, a slow stage light progression of the stage lights 81 is activated to dim the lights 81 prior to the beginning of the specially written track to allow better clarity of viewing of the cuing lights. Crowd cheers also accompany the start of the special jam music track. An enhanced drum set is activated and basic fill progressions synchronized with the cuing lights are started. "Enhanced drum set" as used herein may be defined as a specially programmed drum set to provide special effects, such as echoing or accenting by combining bass drum activation with cymbal activation, or the like for the purpose of improving the sound of inexperienced players. The first part of the song ends, and part two begins. The pads are now activated to become music pads, and cuing lights are activated. Finally, the song ends, and the crowd cheers.

If no visual indicia is selected in step 408B, the user intuitively plays with the unit. In both non-light cued and light cued modes, drum pads and pedals 20 will change to different instruments as the song proceeds in step 410B. First, the control system 70 will activate the standard enhanced drum set 20. As the song theme proceeds and changes, instrument sounds will be sent to the pads by the control system 70. Riffs, progressions, chords and other sounds are contained on a particular pad, step 411B. A variety of programmable variations of the progression or alternate progressions may be employed. For example, a five note bass progression in the key of the music may be assigned to a particular pad. By playing this particular pad at a particular rate, step 412B, the progression is played in the order it was written, with the player's strikes of pads and pedals determining the output or outcome in step 413B. For example, if the player stops at any time during the sequence, step 412B' the progression may begin over in step 413B'. If the particular pad is played for a predetermined time in step 412B'', the progression of sound may change order and length in step 413B''. Other methods may be employed to keep the pad sounds appealing or unpredictable to the user. To this end, the control system can readily be set up to vary the pad set up.

If the "jam lesson" mode is selected in step 406 as illustrated in step 407C of FIG. 4C, a menu is displayed cuing the user to enter a playing level ranging from Beginner 1 to Expert 4 in step 408C. The user next enters a style of music, for example, 1 Rock, 2 Dance/Rap, 3 Country, 4 Heavy Metal, 5 Jazz in step 409C. Next, in step 410C, a voice gives a short explanation of the style of music and the basics of how it is played. In step 411C, if the user selected 1 Rock, then he or she is encouraged to "Try a simple example, this is a basic rock beat." The light indicia 22A–C, 21A and 21B, and 29A cue the proper activation for the hi-hat 22, snare 21 and base drum, respectively. The control system 70 next switches the hi-hat rhythm 24 to the ride cymbal and then snare 21: "Beats can be played on the ride cymbal 24 and snare drum 21 also. The base drum 29 will be added later, for now we will play it for you. The system 70 then activates the bass drum rhythm. System 70 then activates a short background rock style music piece saying "Notice how the beat keeps the music in time." The user practices for a predetermined time, step 413C. "Practice these beats over and over and it will be automatic." When the lesson is over, positive feedback is provided in step 414C, for example, the voice says, "Good job". Subsequent levels may provide more advanced lesson plans building on previous lessons. While the above discussion describes an exemplary lesson, it will be understood many other lessons may be readily programmed.

Finally, in the "jam alone" mode, the user can play the drums with no instruction or cuing. This mode allows the user to test his or ability to play what he or she has learned in previous lessons or on his or her own.

Figure 6:
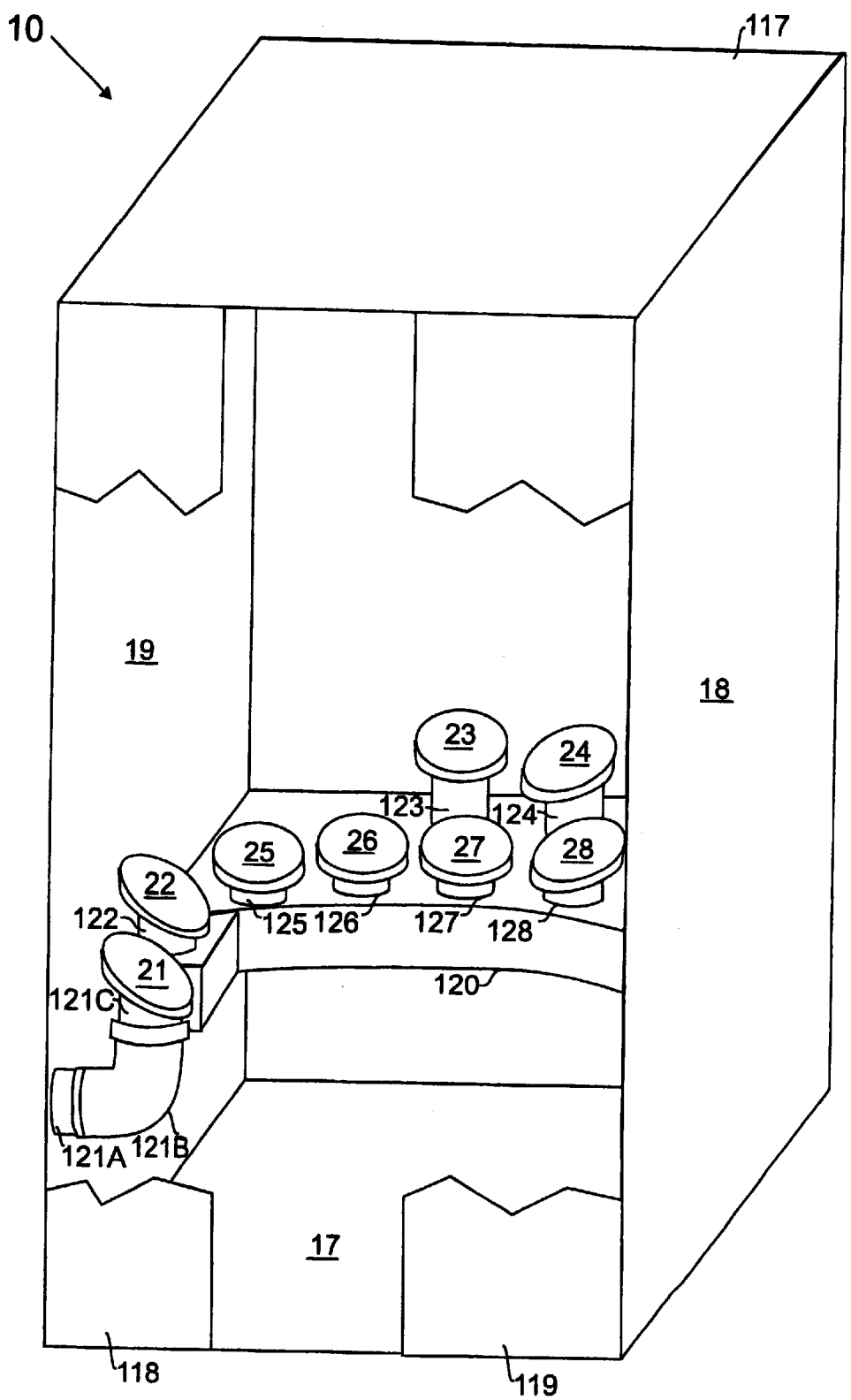
FIG. 6 illustrates an embodiment of a suitable mounting arrangement for the mounting of drum pads of a drum apparatus, as in FIG. 1, in a small footprint cabinet suitable for use in an arcade environment.

Turning to FIG. 6, this figure shows a presently preferred embodiment for constructing cabinet 10 and mounting drum pads 21–28 in a compact manner particularly well-suited to the tight space requirements of the typical arcade. The presently preferred depth of cabinet 10 is 31 inches, the preferred width is 42 inches and the preferred height is 72 inches. Cabinet 10 as shown in FIG. 6 comprises a base 17, sidewalls 18 and 19, top 117 and left and right front side panels 118 and 119. The front side panels 118 and 119 are shown cutaway in FIG. 6 to better illustrate the presently preferred mounting of the drum pads 21–28. The open space between the side panels 118 and 119 may be filled with a sliding, sound-dampening curtain which may be drawn closed when the unit 100 is in use and opened when the unit is not in use. The curtain may be simply manually opened or shut, or an automatic control arrangement may be employed to sense whether a user is sitting in seat 40 or not, or to sense the begin or end of play, and then to automatically open and shut the curtain.

The cabinet 10 also includes a desk or counter top 120 on which drum pads 22–28 are mounted. In the presently preferred mounting technique, these pads 22–28 are mounted on top of varying lengths of hollow plastic pipe 122–128 respectively. The tops of the plastic pipes 122–128 are preferably beveled at an angle to allow their corresponding pads to be readily mounted at a desired angle for playing. The opposite ends of pipes 122–128 extend through cutouts in the counter top 120 and are secured to the counter top 120. The pad 21 is preferably mounted using three pieces 121A–C, two straight lengths 121A and 121C, and an elbow joint 121B. One end of the piece 121A is secured to side 19 of cabinet 10. One end of piece 121C is beveled at an angle to properly support the pad 21.

While the above discussion has been made in the context of presently preferred constructions, components, modes of operation and the like, it will be recognized that the teachings of the present invention may be widely modified to include larger or smaller physical embodiments, greater or smaller numbers of components, different components, and different modes subject only to the limitations of the claims. By way of example, while specific user lessons and specific user feedbacks are described, it will be recognized that such lessons and feedback may vary widely consistent with the present teachings which provide the impetus to provide such functions in the context of a highly user friendly drum jamming system.

I claim:

1. An interactive music game apparatus comprising:
    a money operated mechanism for insertion of a predetermined amount of money to commence play of a music game;
    a plurality of speakers for providing musical output during play of the music game;
    a display to provide indicia to guide play of the music game;
    a musical input device for sensing user input during play of the music game; and
    a cabinet for mounting the money operated mechanism, the plurality of speakers, and the display.

2. The interactive music game apparatus of claim 1 wherein the musical input device further comprises a guitar-like device.

3. The interactive music game apparatus of claim 2 wherein the guitar-like further device comprises a number of buttons whose activation is sensed as user input.

4. The interactive music game apparatus of claim 1 further comprising a stored selection of music of different types and a user operable selection mechanism for selecting a type of music to play along with during play of the music game.

5. The interactive music game apparatus of claim 1 further comprising a processor for monitoring and rating a user's play.

6. The interactive music game apparatus of claim 1 further comprising a stored selection of different play levels and a user operable selection mechanism for selecting a particular play level.

7. The interactive music game apparatus of claim 1 wherein the money operated mechanism is a coin changer.

8. The interactive music game apparatus of claim 1 wherein the money operated mechanism is a bill validator.

9. The interactive music game apparatus of claim 1 wherein the indicia to guide play provided by the display includes a menu to guide a user to select a desired mode of operation.

10. The interactive music game apparatus of claim 1 wherein the indicia to guide play provided by the display includes indicia associated with a plurality of user inputs to provide visual guidance on which user input to activate and when to activate it.

11. The interactive music game apparatus of claim 1 further comprising a processor which controls operation of said game apparatus to provide feedback to encourage a user.

12. The interactive music game apparatus of claim 1 wherein the musical input device is a piano keyboard.

13. The interactive music game apparatus of claim 1 wherein the musical input device is a simple switch arrangement.

14. The interactive music game apparatus of claim 13 wherein the simple switch arrangement is mounted to the cabinet.

15. The interactive music game apparatus of claim 1 wherein the indicia to guide play provided by the display comprises indicia to cue a user to make an input at a particular time.

16. The interactive music game apparatus of claim 1 further comprising lights mounted on the cabinet to simulate stage lighting.

17. The interactive music game apparatus of claim 1 further comprising a holder for holding the musical input device when it is not in use so that the musical input device is readily seen and reached by a prospective user.

18. The interactive music game apparatus of claim 1 wherein the cabinet has a footprint suitable for an arcade environment.

19. The interactive music game apparatus of claim 1 further comprising a processor which monitors the musical input device to collect data on a user's performance during play.

20. The interactive music game apparatus of claim 18 wherein the processor is further operative to control the music game apparatus to provide the user with feedback.

21. The interactive music game apparatus of claim 18 wherein the processor is further operative to control the display to display user feedback.

22. The interactive music game apparatus of claim 1 further comprising a processor which rates a user's rhythm of play.

23. The interactive music game apparatus of claim 1 wherein the insertion of the predetermined amount of money causes the interactive music game apparatus to play for a predetermined time.

24. The interactive music game apparatus of claim 1 further comprising a selection of stored modes of operation including a practice mode which is selectable by a new player unfamiliar with the interactive music game apparatus to practice.

25. The interactive music game apparatus of claim 1 wherein the musical input device is mounted to the cabinet.

* * * * *